United States Patent [19]

Willingham

[11] Patent Number: 4,957,414
[45] Date of Patent: Sep. 18, 1990

[54] FAN AND HUB ASSEMBLY

[75] Inventor: Rainer O. Willingham, Tacoma, Wash.

[73] Assignee: Flex-a-lite Consolidated, Tacoma, Wash.

[21] Appl. No.: 291,943

[22] Filed: Dec. 29, 1988

[51] Int. Cl.$^5$ ............................................. F04D 29/38
[52] U.S. Cl. ........................... 416/229 R; 416/241 A; 416/134 R
[58] Field of Search ............... 416/229 R, 240, 241 A, 416/134, 500

[56] References Cited

U.S. PATENT DOCUMENTS

| | | | |
|---|---|---|---|
| 2,317,502 | 4/1943 | Upson | 416/500 |
| 3,642,379 | 2/1972 | Swearinggen | 416/500 |
| 3,751,181 | 8/1973 | Hayashi | 416/229 R X |
| 4,289,449 | 9/1981 | Frister | 416/241 A |
| 4,321,013 | 3/1982 | Schwarz et al. | 416/241 A |
| 4,605,355 | 8/1986 | Davis et al. | 416/241 A |
| 4,636,142 | 1/1987 | Baranski | 416/241 A |
| 4,671,739 | 6/1987 | Read et al. | 416/241 A X |
| 4,762,465 | 8/1988 | Friedrichs | 416/241 A |

FOREIGN PATENT DOCUMENTS

| | | | |
|---|---|---|---|
| 973135 | 8/1975 | Canada | 416/134 |
| 1950139 | 4/1971 | Fed. Rep. of Germany | 416/229 R |
| 212488 | 3/1924 | United Kingdom | 416/241 A |
| 1435864 | 5/1976 | United Kingdom | 416/229 R |

Primary Examiner—Carl D. Price
Assistant Examiner—Hoang Nguyen
Attorney, Agent, or Firm—Christensen, O'Connor, Johnson & Kindness

[57] ABSTRACT

A fan and hub assembly (60) having a plastic fan structure (62) molded to a hub (66) to achieve a predetermined resonance frequency. The hub (66) has a plurality of integrally formed arms (84) having one of more openings (88) of a predetermined size and predetermined location for permitting the flow-through of the plastic and to achieve a predetermined resonance frequency of the fan blades (64). A plurality of openings (86) are formed in the hub body (82) to permit the flow-through of liquid plastic to achieve a strong attachment of the blade root (76) to the hub (66).

1 Claim, 3 Drawing Sheets

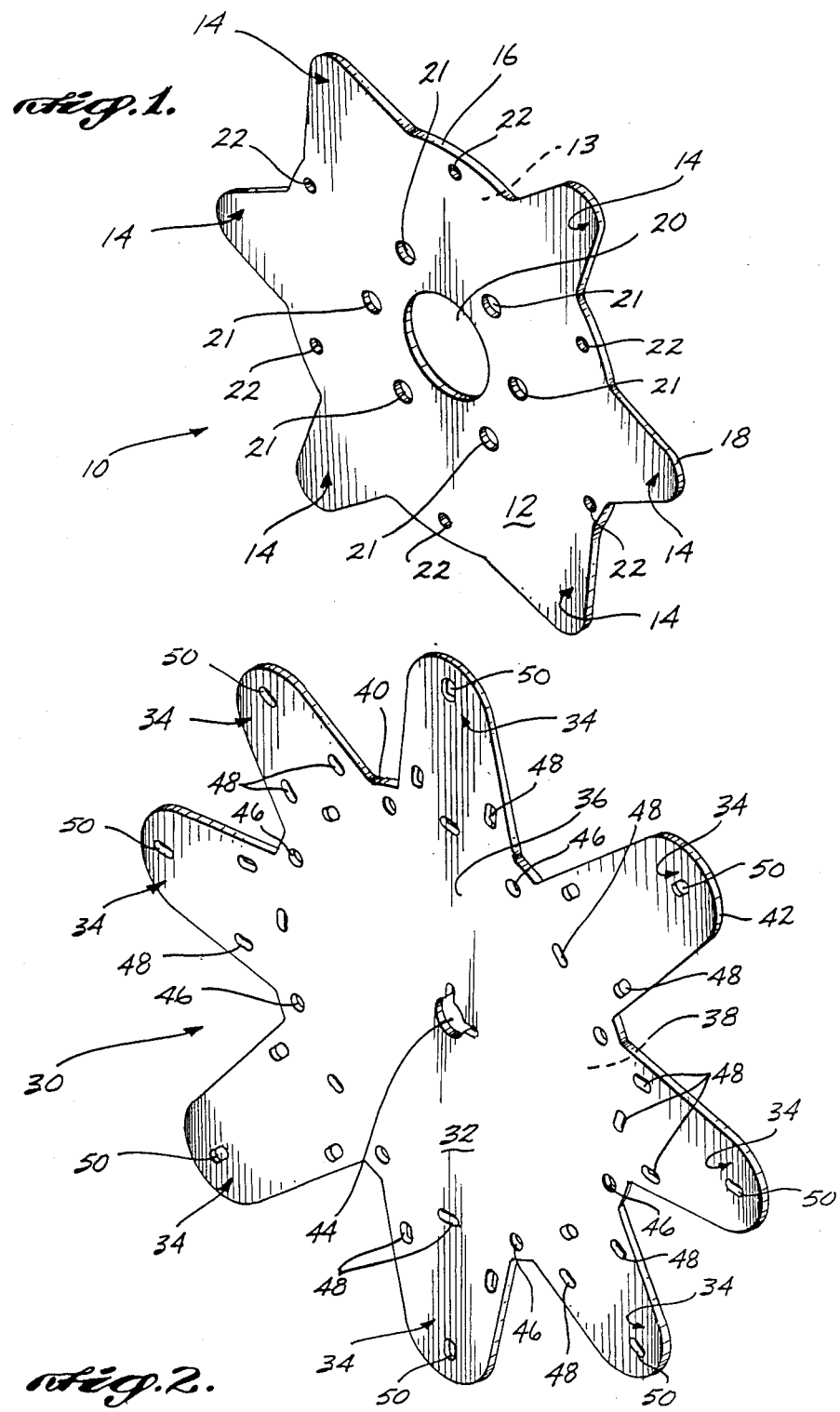

FAN AND HUB ASSEMBLY

TECHNICAL FIELD

The present invention relates to fans and, more particularly, to a fan and hub construction that alters the resonance frequency at which the fan and hub operate.

BACKGROUND OF THE INVENTION

Fans are utilized on gasoline and diesel engines for drawing air through a radiator to assist in cooling the engine. These fans are generally operated by mounting onto a pulley-driven water pump, by direct mounting on the engine crankshaft, or by mounting on a separate fan drive. In most applications, molded plastic fans are preferred because of their light weight requiring less power from the engine or motor.

These plastic fans are subject to large forces, especially in diesel engines used to power large trucks. Rapid acceleration and deceleration of the fan due to piston firing and periodic blasts of air impacting the fan blades as the air enters the engine compartment and drive train vibrations passing through the engine structure cause flexing of the fan blades. In addition, operation of the fan at its resonance frequency will quickly cause the fan blades or the entire assembly to crack and break. This phenomenon occurs when the frequency of an external, periodic driving force, in this case the firing of the engine pistons and the vibration of the drive train from the wheels to the engine, matches the natural free oscillation frequency of the fan, resulting in a large amplitude of oscillation of the blades. Finally, stresses are also placed on the fan from the tension of pulley belts and fluctuations in temperature.

In an attempt to strengthen the plastic fan blades, prior art plastic blades have been molded to a metal hub. Upstanding plastic ribs have also been formed on the hub and attached to the roots of the leading and trailing edges of each blade to brace the blade against flexing. To further strengthen the blades, a ring of molded plastic has been formed around the fan hub between the roots of adjacent blades on both sides of the hub. This particular configuration has several drawbacks. First, the intersection of each rib, blade, and ring forms a large mass of plastic that has molded-in stress points. During operation, this mass easily develops stress cracks, eventually resulting in total failure and breaking apart of the fan. In addition, the fan blades tend to break at the root due to severe blade vibration and flexing that occurs as a result of operating the fan at its resonance frequency. Finally, since these prior art fans are bulky and cannot be nested, they require large amounts of space for storage and shipping.

SUMMARY OF THE INVENTION

In accordance with the present invention, a fan hub for supporting a plurality of molded plastic fan blades is provided. The hub comprises a disc-shaped body having opposing sides and an outside edge; a plurality of openings in the disc-shaped body to provide fluid communication for the molding of the fan blades; and a plurality of arms radially projecting from the body to support and reinforce the roots of the molded fan blades.

In accordance with another aspect of the invention, the radially projecting arms have a smoothly curving profile to eliminate stress points in the molded fan blades.

In accordance with other aspects of the invention, the flow-through openings in the disc-shaped body are positioned near the outside edge of the disc-shaped body.

In accordance with yet another aspect of the present invention, the plurality of arms have one or more openings formed therein of a predetermined size and positioned at predetermined locations to achieve a predetermined resonance frequency of the fan blades when molded to the hub.

In accordance with an alternative embodiment of the present invention, a fan assembly is provided that comprises a hub, the hub having a body and a plurality of arms radially projecting from the body. The assembly further comprises a plurality of openings formed near the outside edge of the body and a plurality of fan blades formed of moldable material, each fan blade having a root portion that is molded to a corresponding arm of the hub and further molded through the openings in the body, such that the root portion of each fan blade is reinforced by the corresponding arm and is firmly attached to the hub through the plurality of openings.

In accordance with another aspect of the present invention, one or more openings are formed in each of the arms. The one or more openings are sized and positioned to achieve a predetermined resonance frequency when the assembly is operating with an engine such that destructive oscillations of the blade are avoided.

In accordance with still another aspect of the invention, each of the arms is integrally formed with the hub body and has an outer edge with a smoothly curving profile that is devoid of corners to prevent the formation of stress points in the fan blades that are molded onto the arms and body.

As will be readily appreciated from the foregoing description, the fan and hub assembly of the present invention achieves a strong blade attachment to the hub and a reinforced blade root. The smoothly curving profile of the arms reduces stress points and the chance of cracking in the root portions of attached fan blades. The flow-through holes in the hub body provide stronger attachment points for the blades, while the flow-through holes in the arms alter the resonance frequency of the blades to avoid prolonged operation of the blades at a destructive resonance frequency. Finally, the present construction allows the blades to be nested for storage and shipping, resulting in greater space efficiency.

BRIEF DESCRIPTION OF THE DRAWINGS

The foregoing and other advantages and features of this invention will become more readily appreciated as the same becomes better understood by reference to the following detailed description when taken in conjunction with the accompanying drawings, wherein:

FIG. 1 is an isometric view of a hub formed in accordance with the present invention;

FIG. 2 is an isometric view of an alternative embodiment of a hub formed in accordance with the present invention;

DETAILED DESCRIPTION OF THE PREFERRED EMBODIMENT

Figure 3:
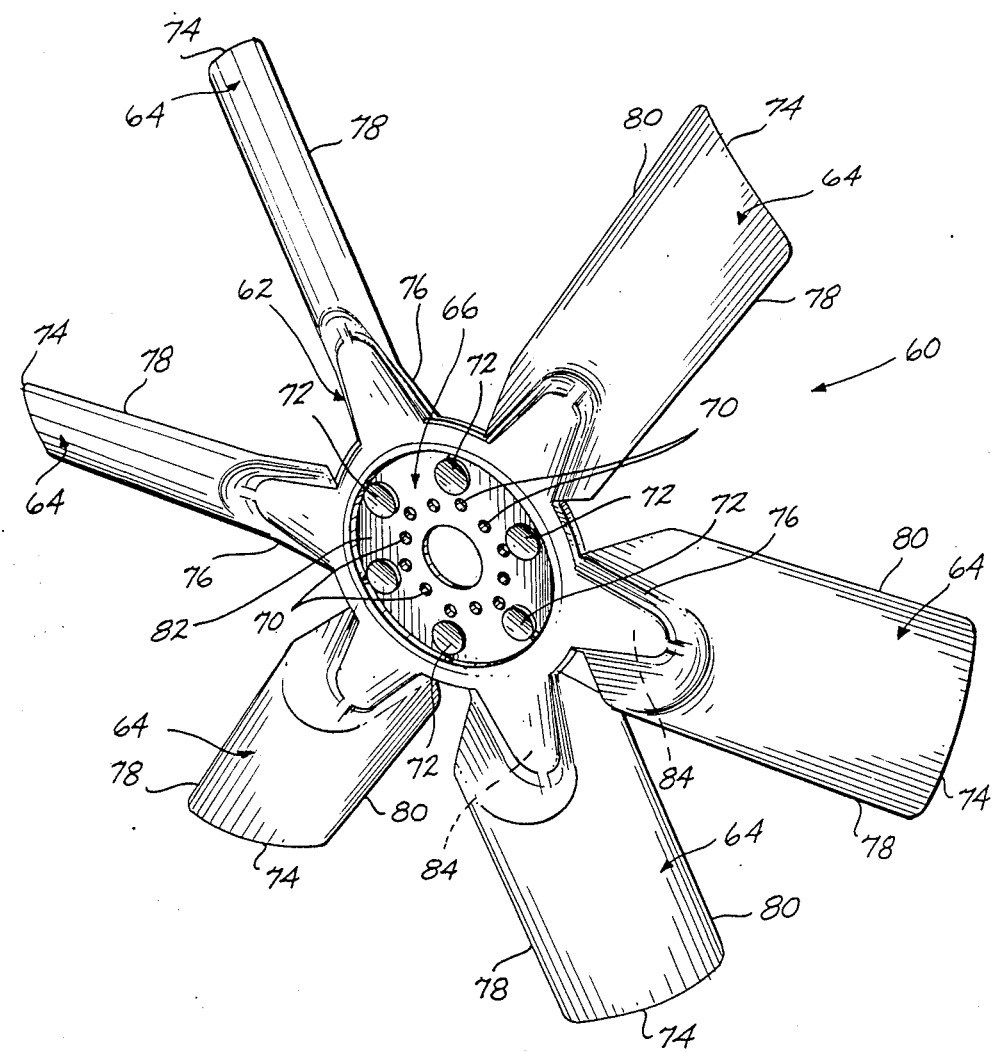
FIG. 3 is an isometric view of a fan and hub assembly formed in accordance with the present invention illustrating a fan structure molded to a hub; and, FIG. 4 is a cross-sectional view taken along lines 4—4 of the fan and hub assembly of FIG. 3.

Referring initially to FIG. 1, a fan hub 10 having a central body portion 12 with a plurality of radially extending arms 14 is illustrated. The body 12 is disc-shaped, having a first side 11, an opposing second side 13, and an outside edge 16 that defines the general circumference of the body 12. Each of the arms 14 is integrally formed with the body 12 and has outer edges 18 that merge with the outside edge 16 of the body 12 to achieve a smoothly curving profile. As such, the absence of protrusions and corners at the intersection of the body 12 and the arms 14 and along the outer edges 18 of the arms avoids the creation of stress points in the hub 10, as well as the formation of stress points in fan blades that are molded around the arms 14 and to body 12. Furthermore, the arms 14 lie in the same plane as the body 12 and serve as reinforcement for the root portions of fan blades that are molded thereon.

The body 12 has a central hole 20 for mounting the fan hub 10 to a spindle on the crankshaft of an engine, a water pump, or a fan drive pulley. A plurality of bolt holes 21 are positioned near the central hole 20 to facilitate mounting of the hub 10. Spaced around the circumference of the body near the outside edge 16 are a plurality of flow-through openings 22. These openings 22 permit hardenable liquid plastic to flow through the body 12 when fan blades are molded to the hub 10, facilitating the knitting of the plastic from the first side 11 and the second side 13 of the body 12. The flow-through openings 22 are evenly spaced around the body 12 and are positioned on either side of each arm 14 so that fan blades that are later molded to the body 12 will be firmly attached to the hub 10. However, the size, shape and position of the flow-through openings 22 can be shifted around the circumference of the body 12 if desired. Additional openings 22 may be formed in the body 12 to provide further attachment points.

In the representative embodiment illustrated in FIG. 1, six arms 14 are shown evenly spaced around the outside edge 16 of the body 12. More or less arms may be used, however, to accommodate the attachment of more or less than six fan blades. Finally, although each arm 14 has the general configuration of a triangle with rounded corners, other shapes, such as rectangular or square, may be used to match the configuration of the root of the corresponding fan blade. Whatever configuration is used, it is important that inside and outside corners be rounded to avoid the creation of stress points.

FIG. 2 illustrates an alternative embodiment of the invention, wherein a fan hub 30 has a disc-shaped body 32 with eight integrally formed, radially projecting arms 34. The hub 30 is similar to the previously described fan hub 10 in that the body 32 has a first side 36, a second side 38, and an outside edge 40 defining the general circumference of the body 12. The arms 34 are similar to the arms 14 in that they are integrally formed with the body 32 and have outer edges 42 with a smoothly curving profile that avoids the formation of corners at the intersection of the arms 34 and the body 32.

The body 32 has a keyed hole 44 for mounting of the hub 30 to a mold. After molding of the fan blades, the keyed hole 44 will be punched out and bolt holes will be added for mounting of the hub to an engine or motor. A plurality of circular openings 46 and oblong openings 48 are formed in the body 32 and positioned near the outside edge 40. As described previously, these openings permit hardenable liquid plastic to flow through the body 32 during the molding of the fan blades to the hub 30 to allow knitting of the plastic to achieve stronger attachment of the plastic to the hub 30. The use of the oblong openings 48 provides for greater flow-through of the liquid plastic from the first side 36 and the second side 38 of the body 32.

Each of the radially projecting arms 34 has one or more holes 50 formed therein to permit the flow-through of hardenable liquid plastic during the molding of the fan blades to the hub 30. These holes 50 are sized and positioned to alter the resonance frequency of attached blades when the hub and blades are operating on an engine. Although three holes 50 are shown in each arm 34, the number, size and position of the holes may vary from hub to hub, depending on the desired resonance frequency. The method of determining the size, location, and number of openings in the arms 34 to achieve a predetermined resonance frequency is described more fully below.

Figure 4:
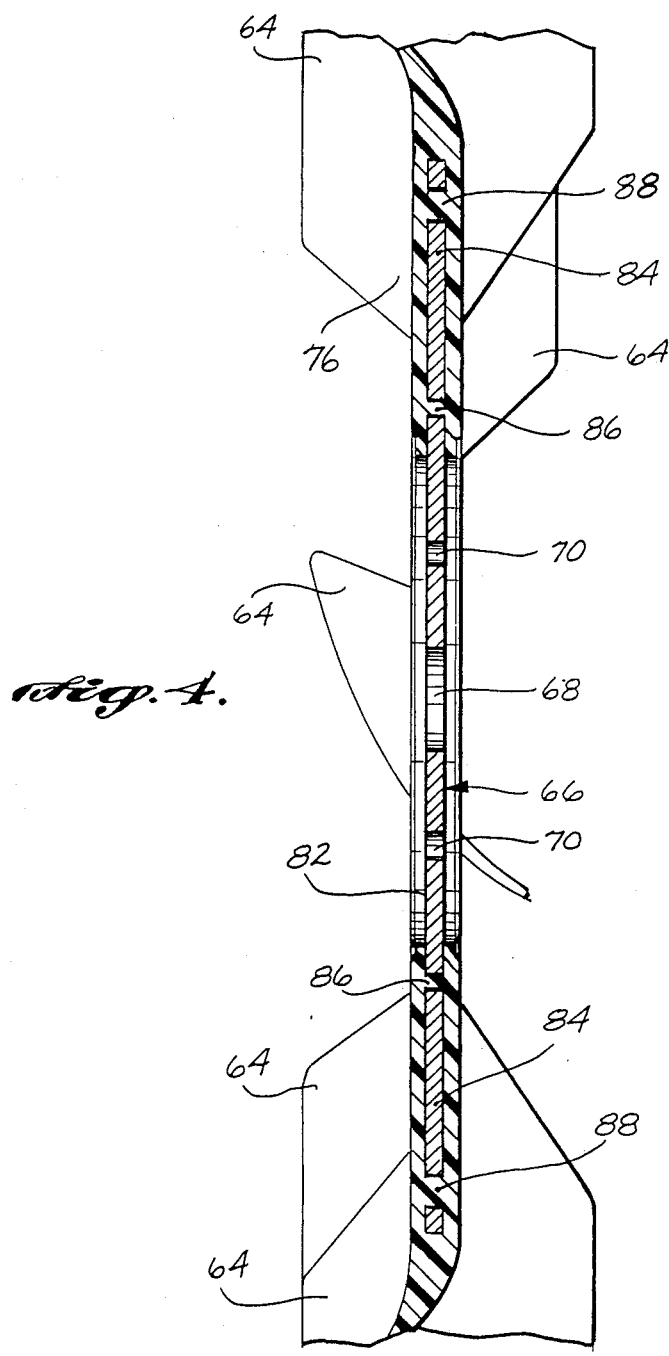

FIGS. 3 and 4 illustrate a fan and hub assembly 60 comprising a fan structure 62 having a plurality of blades 64 formed of plastic and a hub 66 to which the fan structure 62 is molded. The hub 66 has the same construction as the hub 30 illustrated in FIG. 2 with the exception of having six instead of eight arms. A central passageway 68 is used for mounting the fan and hub assembly 60 to an engine or motor. A plurality of bolt holes 70 enable attachment of the assembly 60 to the engine or motor structure.

Six fan blades 64 formed of plastic are molded to the hub 66. As shown in FIG. 3, plastic cold slugs 72 project onto the hub 66 from the fan structure 62. These cold slugs 72 are formed when the leading flow of liquid plastic is directed out onto the hub 66 during the molding process to avoid the formation of a knit line in the plastic between the blades 64. A knit line is typically formed when the leading flow of liquid plastic meets another leading flow of liquid plastic. Because the leading flow is cooler than the following plastic, the resulting intersection of the two leading flows forms a knit line that creates a weak point in the structure. This knit line is avoided in the present invention by directing the leading flow of liquid plastic onto the blade hub 66. After molding, the cold slugs 72 are broken off and removed.

Each blade 64 has a tip 74, a root 76, a leading edge 78, and a trailing edge 80. As shown more clearly in FIG. 4, the hub 66 has a disc-shaped central body portion 82 and a plurality of radially projecting arms 84. The arms are integrally formed with the body 82 to have a smoothly curving profile. Openings 86 are formed in the body 82 to permit the flow-through of liquid plastic to firmly attach the blade root 76 to the hub 66. Holes 88 are formed in the arms 84 to achieve a predetermined resonance frequency of the fan and hub assembly 60.

The size, location, and shape of the holes 88 is determined by testing and analysis. Because prolonged operation of fan blades on an engine at the blades' resonance frequency will result in immediate weakening and destruction of the blades, it is desirable to alter the resonance frequency of the blades. The most accurate method of determining the resonance frequency in this case is to test the fan and hub assembly 60 in operation with the engine and vehicle on which it will be used.

This is accomplished by mounting the fan and hub assembly 60 on the engine. Sensing equipment, such as strain gauges or accelerometers, are attached to the fan structure 62 at random locations, and the engine is then operated. The resonance frequency is then determined by noting the engine speed at which the greatest amounts of stress are recorded. If the resonance frequency falls within the normal operating range of the engine, the resonance frequency can then be altered by constructing a new fan and hub assembly 60 wherein the holes 88 are repositioned or more or less holes are formed in the arms 84. The new fan and hub assembly 60 is then tested in the manner previously described. This procedure is repeated until the size, location, and configuration of the holes 88 is found which moves the resonance frequency out of the operating range of the fan blades when mounted on the engine.

Testing may also be done using other methods, such as modal analysis, an accelerometer machine, or an oscillating table. In modal analysis, sensors are placed at random points around the blade and an impact hammer hits the blade. A computer connected to the sensors records the oscillations of the blades and generates a printout that indicates the resonance frequency by amplitude at the various locations. The holes 88 are then varied as to size, configuration or location, and the structure is tested again to determine the effect on the resonance frequency. With an accelerometer machine, the fan and hub assembly 60 is mounted in a vertical plane and subjected to rapid rotational acceleration and deceleration. Again, the results of stress analysis on the blades can determine the location of stress points and the resonance frequency of the fan blades. With the oscillating table, the fan and hub assembly are mounted in a horizontal position and sensors are attached at random locations to detect and record the oscillation of the blades. The table is vibrated in the vertical plane at various amplitudes and frequencies to determine the resonance frequency. All of these test methods are commercially available, either through testing equipment manufacturers or through companies that perform these tests, such as the Boeing Test Services located in Seattle, Washington.

Preferably, the hub 66 is constructed of steel, aluminum, or plated steel. The fan structure 62 may be constructed of any plastic, but, for temperature and vibration resistance, it has been found that 70G33 fiberglass-reinforced type 6/6 nylon manufactured by Dupont, located in Wilmington, Del., has worked best. In order to avoid stress points and achieve the strongest structure, it is important that all openings or holes in the hub be formed to have smooth curves and without the presence of any corners.

While a preferred embodiment of the invention has been described, it is to be understood that various changes can be made therein without departing from the spirit and scope of the invention. For example, the location of the cold slug 72, as illustrated in FIG. 3, is at the midway point between the blades 64. The position of the cold slug 72 may be moved to any point in relation to a blade 64, including in alignment with the center of a blade 64. Consequently, the invention can be practiced otherwise than as specifically described herein.

The embodiments of the invention in which an exclusive property or privilege is claimed are defined as follows:

1. A method for producing a fan hub for supporting a plurality of molded plastic fan blades, comprising the steps of:

forming a disc-shaped body having opposing sides, an outside edge, and a plurality of arms;

forming a plurality of openings in said disc-shaped body for permitting fluid communication from said opposing sides to facilitate attachment of the fan blades to the hub;

forming one or more openings in each of said arms, the size and position of said openings being selected to establish a predetermined resonant frequency in an assembly consisting of said fan hub and said plurality of molded plastic fan blades, said predetermined resonant frequency being different than the frequency of periodic forces that act upon said assembly when said assembly operates in its intended environment; and thereafter molding fan blades to said disc-shaped body.

* * * * *